United States Patent [19]

Leon

[11] Patent Number: 5,370,341
[45] Date of Patent: Dec. 6, 1994

[54] ULTRALIGHT HELICOPTER AND CONTROL SYSTEM

[76] Inventor: Ross Leon, 5651 Muddy Creek Rd., Cincinnati, Ohio 45238

[21] Appl. No.: 223,175

[22] Filed: Apr. 5, 1994

[51] Int. Cl.$^5$ .................................... B64C 27/00
[52] U.S. Cl. ................. 244/17.11; 244/903; 244/900
[58] Field of Search ........... 244/17.11, 903, 900, 244/17.23, 222, 904, 901

[56] References Cited

U.S. PATENT DOCUMENTS

| | | | |
|---|---|---|---|
| 2,596,378 | 5/1952 | Dobbins | 244/4 A |
| 3,162,400 | 12/1964 | Wood | 244/17.11 |
| 3,554,467 | 1/1971 | Yowell | 244/17.19 |
| 3,570,786 | 3/1971 | Lewis, II | 244/17.13 |
| 3,572,616 | 3/1971 | Ulisnik | 244/17.23 |
| 3,574,483 | 4/1971 | Linden | 416/130 |
| 3,576,299 | 4/1971 | Hanson | 244/17.19 |
| 3,591,109 | 7/1971 | McLarty | 244/17.23 |
| 3,722,830 | 3/1973 | Barber | 244/17.23 |
| 4,008,979 | 2/1977 | Cooper et al. | 416/40 |
| 4,047,838 | 9/1977 | Ferris et al. | 416/115 |
| 4,478,379 | 10/1984 | Kerr | 244/17.11 |
| 4,525,123 | 6/1985 | Curci | 416/115 |
| 4,531,692 | 7/1985 | Mateus | 244/17.19 |
| 4,607,811 | 8/1986 | Rousseau | 244/903 |
| 4,720,059 | 1/1988 | Stearns, Jr. | 244/17.11 |
| 4,787,573 | 11/1988 | Pauchard | 244/17.23 |
| 4,874,291 | 10/1989 | Roberts et al. | 416/122 |
| 4,997,414 | 3/1991 | Camara et al. | 475/330 |
| 5,152,478 | 10/1992 | Cycon et al. | 244/12.2 |
| 5,217,189 | 6/1993 | Sandage | 244/904 |

*Primary Examiner*—David A. Bucci
*Assistant Examiner*—Anne E. Bidwell
*Attorney, Agent, or Firm*—Wood, Herron & Evans

[57] ABSTRACT

An ultralight helicopter has a pair of counter-rotating rotor assemblies which in combination yield zero net angular momentum when rotating at equal speeds. A single motor drives both rotors through a counter-rotating bevel gear set coupled to a pair of concentrically nested output shafts. In an alternative embodiment, the motor is coupled to the rotors through a hydraulic drive system which includes a hydraulic pump and at least one hydraulic motor driving each of the rotor assemblies. The pilot is advantageously suspended in a "hang-glider" type harness from a single hang point positioned proximate the center of lift of the helicopter. A control bar is fixedly mounted to the frame and is grasped by the pilot suspended in the harness. The pilot maneuvers the helicopter in both the pitch and roll directions by manipulating the control bar. The pilot shifts his own center of gravity relative to the center of gravity of the helicopter while grasping the control bar to thereby maneuver the helicopter.

22 Claims, 4 Drawing Sheets

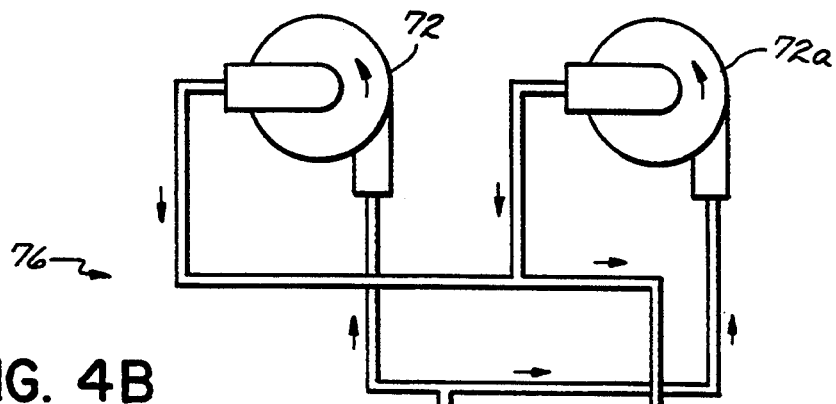
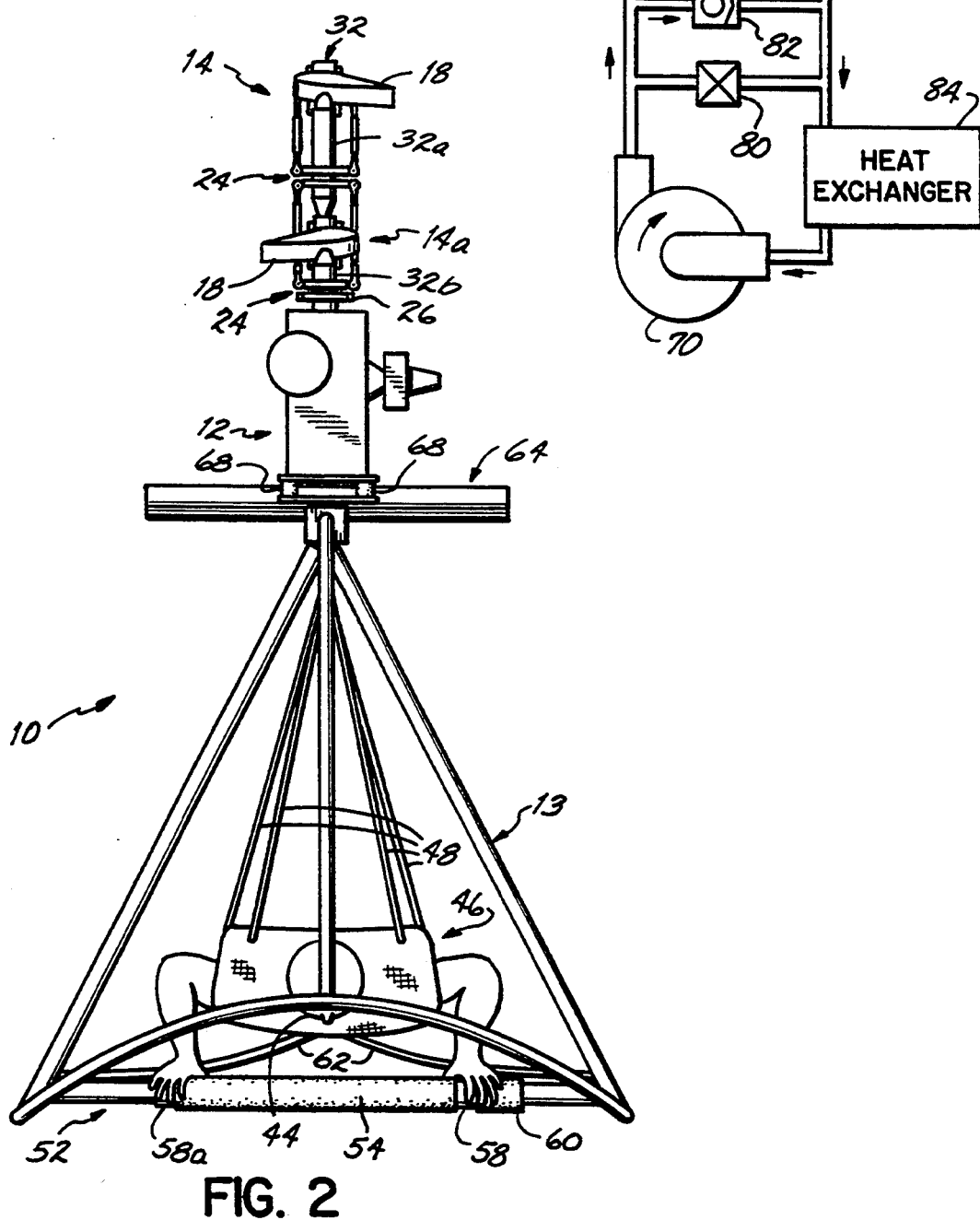
FIG. 4B
FIG. 2

ULTRALIGHT HELICOPTER AND CONTROL SYSTEM

BACKGROUND OF THE INVENTION

This invention relates to helicopters, and more particularly to an ultralight helicopter with a simplified, economical and improved pitch and roll control mechanism.

The current state-of-the-art in helicopters is such that even small helicopters (e.g., the two-passenger ROBINSON TM R22 and the MINI TM 500) have control systems that are nearly as complex as the control systems of more traditional large helicopters. The control systems require a tail rotor with collective pitch control, a main rotor with collective pitch control and cyclic pitch control, a throttle control and various trim controls. The complexity of the machinery required to accomplish this generally results in a prohibitively high cost for small helicopters.

The ROBINSON TM R22 for example, costs on the order of $100,000–$120,000 in 1993 U.S. dollars, the same range of cost as a median house. In addition, the empty weights of these types of machines are in the vicinity of 500–1000 lb., figures far too high to meet the requirements for an ultralight aircraft under Federal Aviation Regulations (FAR) Part 103. Finally, the control complexity is such that lengthy and expensive pilot training is required in order for a pilot to develop proficiency in flying this type of conventional aircraft.

As used herein with reference to an aircraft the term "pitch" refers to the attitude of the nose of an aircraft as it rises or falls about a lateral axis relative to the tail of the aircraft. As used herein the term "yaw" refers to the angular orientation of the aircraft about a vertical axis. As used herein the term "roll" refers to the attitude of the aircraft about its longitudinal axis.

One prior solution to solving the complexity of helicopter pitch and roll control systems is disclosed in U.S. Pat. No. 3,722,830 issued to Barber on a helicopter type vehicle. This patent discloses a helicopter in which the pilot has to shift, in the fore-and-aft plane only, himself, his seat, and the control panel with a hand crank along rails inside a cabin. In addition, the motors which drive counter-rotating propellers of the vehicle described in this patent are pivotally mounted about the axis of rotation of the propellers. The position of the motors is angularly shifted during flight to shift the center of gravity of the vehicle for vehicle control. In this system, the weight shift is an auxiliary measure to the principal control mechanism using the pivotal movement of the motors, and is only used for the pitch direction. However, the pitch and roll control system in this patent is still too complex and expensive to be adapted for economical use in an ultralight helicopter.

Another prior pitch and roll control system for helicopters is disclosed in U.S. Pat. No. 4,787,573 issued to Pauchard on an aircraft with dual rotary wings. In this vehicle the pilot, seat and fuel tank are slidably mounted for movement in one plane only, on a set of bars inside the "nacelle", or cockpit. The weight shift of the pilot is the primary pitch control, but roll control is effected with differential braking of the rotor rings. Once again, this control system is too complex and expensive for use in an affordable ultralight helicopter. Furthermore, with the system of Pauchard, the weight of the pilot, seat and fuel tank are disposed in the middle of the two rotors, which could potentially result in unacceptable instability.

Yet another prior system is disclosed in U.S. Pat. No. 3,554,467 issued to Yowell on a counter-rotating rotor transmission for helicopters. This system includes a pitchable gearbox and rotor assembly fixed atop a fuselage, wherein the fore-and-aft motion of the helicopter is accomplished via tilting the rotor assembly. All other motions are controlled by deflection of the rotor's airflow using large, external, rotatable control surfaces. The complexity of the control system required to operate the rotatable control surfaces for roll control is a disadvantage of the system disclosed in the Yowell patent.

As evidenced by these prior solutions, there still exists a need for a pitch and roll control system for use in an ultralight helicopter which is simple, effective and economical.

SUMMARY OF THE INVENTION

It has been a primary objective of this invention to provide an improved helicopter which is both economically affordable and safe for the user.

A further objective has been to provide such a vehicle with a simplified and improved pitch and roll control system.

A still further objective has been to provide such a vehicle which is classified as an ultralight aircraft according to Federal Aviation Regulation (FAR) Part 103.

These and other objectives of the invention have been obtained by an ultralight helicopter with a pair of counter-rotating rotor assemblies which in combination yield zero net angular momentum when rotating at equal speeds. Alternatively, the helicopter can be equipped with a pair of side-by-side intermeshing rotors according to this invention. A single motor drives both rotors through a counter-rotating bevel gear set coupled to a pair of concentrically nested output shafts. In an alternative embodiment of this invention, the motor is coupled to the rotors through a hydraulic drive system which includes a hydraulic pump and at least one hydraulic motor driving each of the rotor assemblies.

In this invention, the pilot is advantageously suspended in a "hang-glider" type harness from a single hang point positioned proximate the center of lift of the helicopter. A control bar is fixedly mounted to the frame and is grasped by the pilot suspended in the harness. The pilot maneuvers the helicopter in both the pitch and roll directions by manipulating the control bar. The pilot shifts his own center of gravity relative to the center of gravity of the helicopter while grasping the control bar to thereby control the helicopter.

The helicopter of this invention includes a tail assembly connected to the frame. The tail assembly provides added pitch and yaw stability to the helicopter during forwardly directed flight. In addition, the rotor assemblies of the helicopter in this invention are equipped with variable pitch rotors. The rotational speed of the rotors is adjusted with a throttle control mechanism on the engine. The variable pitch rotors and the throttle control mechanism can each be operated by actuators conveniently located on the control bar for use by the pilot during flight.

In the present invention, weight shift by a pilot freely swinging in a harness is the sole control mechanism for both the pitch and roll directions, and the rotor is simplified that it need only supply variable lift by means of its collective pitch setting. Additionally, it is evident that in the present invention, both the pilot and the airframe represent pendular weights disposed beneath the rotors, tending to stabilize the whole assembly.

BRIEF DESCRIPTION OF THE DRAWINGS

The objectives and features of this invention will become more readily apparent from the following detailed description taken in conjunction with the accompanying drawings in which:

FIG. 2 is a front view of the helicopter of FIG. 1;

FIG. 4B is a hydraulic flow circuit diagram to be used in conjunction with the hydraulic rotor drive assembly of FIG. 4A; and, FIG. 5 is a plot of disk loading versus power loading for representative helicopters.

DETAILED DESCRIPTION OF THE INVENTION

Figure 1:
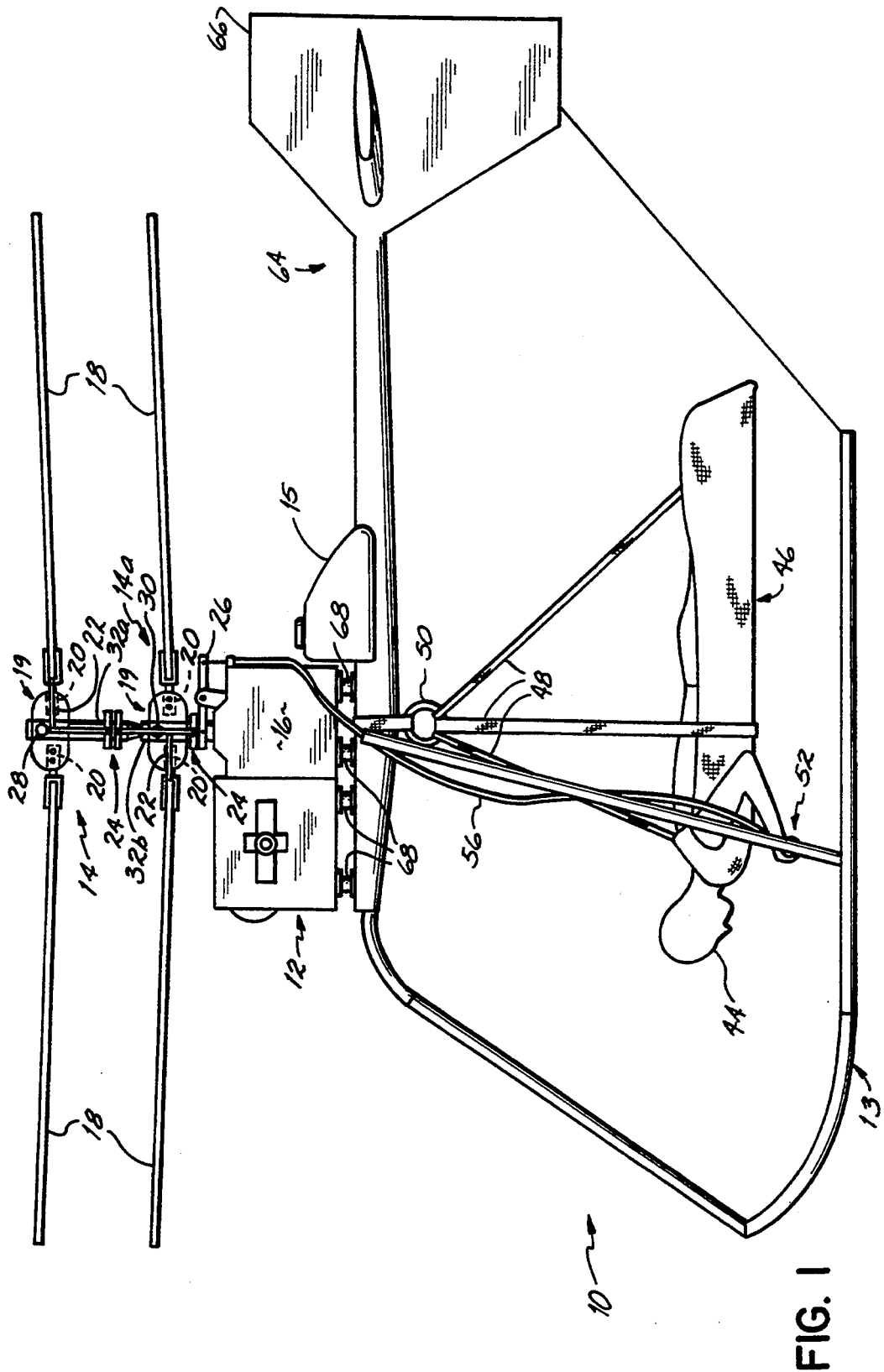
FIG. 1 is a side view of a helicopter according to this invention.

The present invention comprises a helicopter 10 as shown in FIGS. 1 and 2 including an engine 12 connected to a frame 13 and driving a pair of counter-rotating bladed rotor assemblies 14, 14a through a gearbox 16. A fuel tank 15 is mounted near the engine 12 and hoses (not shown) deliver fuel to the engine 12. A plurality of blades 18 on the rotor assemblies 14, 14a have collective pitch control as is well known in the art. This is accomplished through a collective pitch control system 19 including pitch bearings 20 at each blade root, and pitch horns 22 driven through a rotating star and turnbuckle mechanism 24 and a control fork 26. The pitch horns 22 comprise means to simultaneously adjust the pitch of the rotor blades 18 as is well known in other collective pitch control systems. The rotors 14, 14a teeter about teeter hinges 28, 30, respectively, located at the rotor connections to a drive shaft 32.

Figure 3:
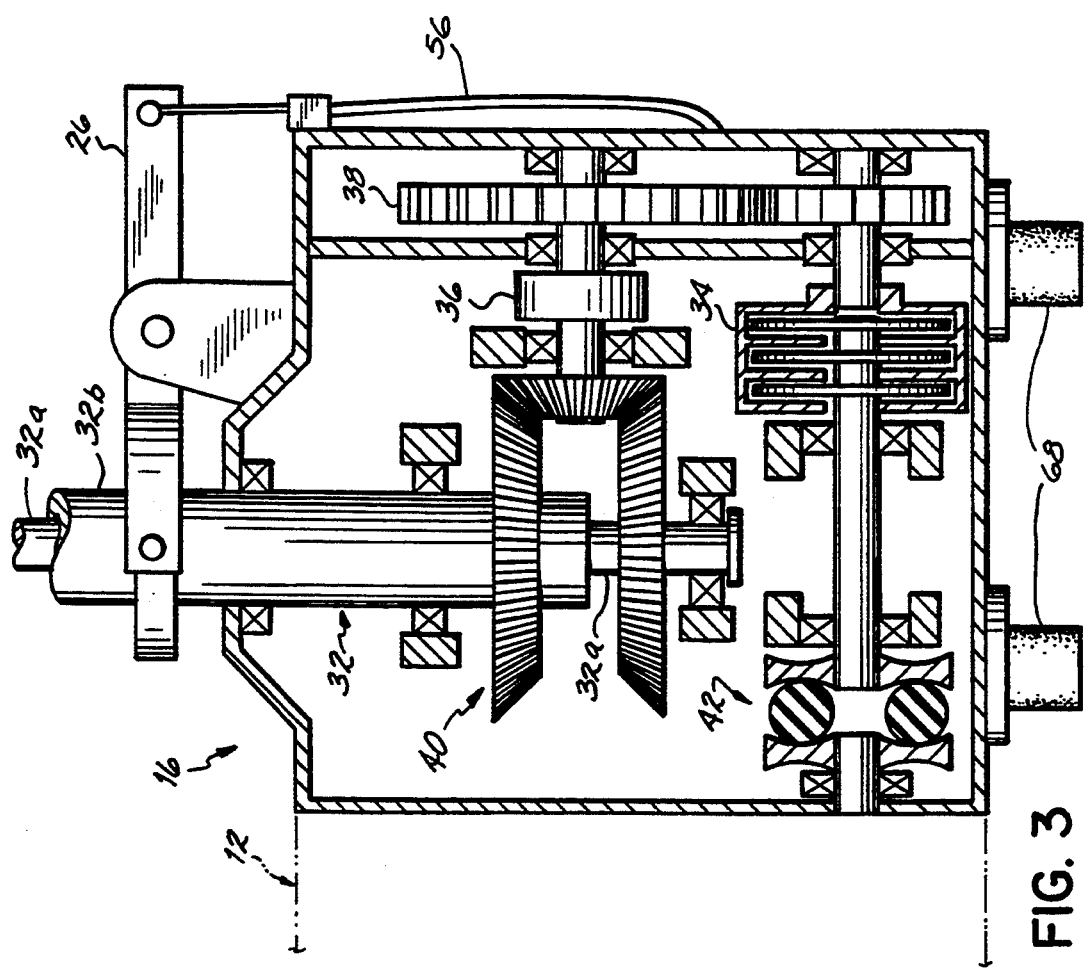
FIG. 3 is a cross-sectional side view of the of the gearbox.

The gearbox 16 as shown in FIG. 3 has internal components which will engage the rotors 14, 14a at a specific engine speed via a clutch 34, and allow the rotors 14, 14a to over-run the engine 12 by means of a freewheel mechanism 36. Reduction of the speed of the shaft 32 is substantially accomplished through gearsets 38 and 40. Gearset 38 is a counter-rotating bevel gear set that drives two nested output shafts 32a and 32b. A flexible coupling 42 may be included to isolate engine and rotor vibrations.

The counter-rotating rotor assemblies 14, 14a which are identical in design but mirror-images of each other, produce zero net angular momentum as a group when rotating at the same speed. Therefore, the rotors 14, 14a, and their associated lift force, can be pointed in any direction by application of a torque to the whole assembly in the desired direction of movement. As a result, the need for complicated cyclic pitch control which is required on most helicopters to overcome the angular momentum of the single rotor is eliminated. In addition, in the present invention the engine 12 produces essentially no net torque on the frame 13 of the helicopter 10. Therefore, the helicopter 10 does not tend to yaw in one direction or the other, and the need for a tail rotor is eliminated.

In the ultralight helicopter size range, elimination of the tail rotor is quite important for two reasons. Firstly, the tail rotor generally absorbs and wastes 20–25% of the power produced by the engine. This is unacceptably high in designing an aircraft that meets the FAR Part 103 empty weight limit requirement of 254 lb. "Empty weight" is defined as the weight of the aircraft absent the pilot, gasoline and associated other fluids. Secondly, the coupling between the main and tail rotors is such that, in a conventional helicopter, fine control adjustments need to be made continually whenever the main rotor is used to move the craft. This is due to the variations in anti-torque force required from, and power absorbed by, the tail rotor. The constant interplay between main rotor collective pitch setting, main rotor cyclic pitch setting, throttle setting, and tail rotor pitch setting makes learning to fly a standard helicopter equipped with a tail rotor a difficult and lengthy process. In the present invention, the control interplay is reduced to throttle setting and main rotor collective pitch setting, resulting in an easier-to-fly aircraft. The power required to drive the rotors 14, 14a is supplied by an engine 12 on the order of 20% smaller than would normally be required with conventional control systems.

The engine 12, gearbox 16 and rotor assembly 14 are attached to the open airframe 13. The open air frame 13 is constructed of aluminum and/or steel tubes, cables, sailcloth and composite materials comprising fiberglass or graphite epoxy coated over a foam base as is well known in the art for the construction of aircraft. A pilot 44 is suspended from the airframe 13 in a carrier assemblage or "hang gliding" type harness 46. The harness 46, of which many examples exist, is essentially a lightweight fabric cocoon shaped harness with a plurality of suspension straps 48 leading up to a single hang point where they are secured to a carabiner 50 or other locking ring-like mechanism. The carabiner 50 is preferably located proximate the center of lift of the helicopter. The harness 46 weight is preferably approximately 5 lb.

The pilot 44 maneuvers the aircraft 10 in both the pitch and roll directions through shifting of his own weight about the harness hang point, while grasping a control bar 52, in a manner analogous to that used to control a hang glider. Roll maneuvers are executed by swinging the pilot's body a small distance to the side, causing a torque on the aircraft 10 which tends to roll the airframe 13 because the pilot's center-of-gravity is no longer directly in line with the center of lift of the rotors 14, 14a. Pitch maneuvers are executed by the pilot swinging his weight slightly forward or aft within the airframe 13, which similarly causes a torque tending to pitch the airframe nose up or nose down as required. The pilot's weight makes up on the order of 40% of the weight of the whole aircraft 10 so the carabiner 50 is preferably located close to the rotor axis or center of lift to avoid balance problems.

In the present invention, weight shift by the pilot 44 freely swinging in the harness 46 is the sole control mechanism for both the pitch and roll directions, and the rotor assemblies 14, 14a are so simplified that they need only supply variable lift by means of the collective pitch control system. Additionally, it is evident that in the present invention, both the pilot 44 and the airframe 13 represent pendular weights disposed beneath the rotors 14, 14a, tending to stabilize the aircraft 10.

The collective pitch control system 19 for the rotor blades 18 includes a large twist grip or actuator 54 extending across the majority of the control bar 52 and positioned such that it can be twisted with both hands by the pilot 44. This grip 54 is attached by a control cable 56 to the collective pitch control fork 26 (FIG. 1). On each end of this twist grip 54 are fixed, stationary lands 58, 58a for the left and right hands, respectively, of the pilot. The maximum required blade pitch angle range is approximately 18°, whereas the range of grip twist angle available at the pilot's hand is expected to be about 90°. The ratio of the angular motion of the twist grip 54 to that of the pitch angle motion of the blades 18, i.e., the mechanical advantage, will preferably be set in the control system linkages to at least 5:1. This gives the pilot 44 a considerable amount of mechanical advantage; however, the grip 54 is configured to allow for simultaneous manipulation with both hands because the torque which is required to move the blades 18 to a new collective pitch setting at high rotor lift conditions may exceed the torque which the pilot 44 can supply using only one hand. By using hand-over-hand motion on the twist grip 54, an angular range greater than 90° would result, and a mechanical advantage greater than 5:1 could be achieved. Beyond one end of the collective pitch twist grip 54 is located a throttle control twist grip or actuator 60, preferably of a type with enough friction to hold a fixed setting.

In order for the pilot 44 to remain uninjured during a hard landing or in the event of a crash, it may prove desirable to restrain the pilot 44 inside the airframe 13 with a plurality of safety straps 62. These straps 62 can be adjusted in length such that the pilot 44 will be able to maneuver the aircraft 10 but his head and torso will not be able to swing so far as to contact any of the airframe members.

The airframe 13 extends aft and is formed into a tail assembly 64 including a vertical tail assembly 66, which is required for stability as the helicopter attains forward velocity. The helicopter 10 has no direct yaw control, and may have a tendency to "weathervane" into the wind when flying at low airspeeds; this is not considered to be a major drawback. The pilot 44 needs to remain aware of the possibility of weathervaning and account for it at low airspeeds.

The airframe 13 is preferably connected to the engine 12, gearbox 16 and rotor assemblies 14, 14a by means of flexible mounts 68 to dampen the vibration which may be transmitted to the airframe 13.

An important feature of this invention is for the overall helicopter 10 to be light in weight so that the pilot's weight shift provides adequate pitch control. It is for this reason that this control strategy likely cannot be applied to larger, heavier conventional helicopters. In addition, it is preferable for the aircraft empty weight to be 254 lb. or less, as this is the upper limit for ultralight aircraft as spelled out in FAR Part 103. For this reason, a component by component weight estimate and other preferable design parameters are shown in Table 1.

TABLE 1

| | ESTIMATED WEIGHT AND LOADINGS SUMMARY | | |
|---|---|---|---|
| | ITEM | WEIGHT (LB) | SOURCE |
| Pilot | Pilot | 180 | Maximum Pilot Weight |
| | Harness | 5 | H.E.S. Cocoon Harness |
| Subtotal: 193 lb. | Parachute | 8 | H.E.S. Emergency Chute |
| Engine | R447 Engine Block | 61.5 | Rotax, Inc. |

TABLE 1-continued

| | ESTIMATED WEIGHT AND LOADINGS SUMMARY | | |
|---|---|---|---|
| | ITEM | WEIGHT (LB) | SOURCE |
| | Carburetor | 2.5 | Rotax, Inc. |
| | Exhaust Pipe | 10 | Rotax, Inc. |
| Subtotal: 77 lb. | Engine Mount | 3 | Leading Edge Air Foils, Inc. |
| | Fuel | 31.5 | 5 gal @ 6.3 lb/gal |
| Airframe | Horizontal Tail | 4 | Estimate |
| | Vertical Tail | 3 | Estimate |
| | Downtubes | 6 | Estimate |
| | Skids | 8 | Estimate |
| | Noise Tube | 2.5 | Estimate |
| | Keel | 8 | Estimate |
| | Fuel Tank | 4 | Leading Edge Air Foils, Inc. |
| Subtotal: 41.5 lb. | Control Bar | 2 | Estimate |
| | Controls | 4 | Estimate |
| Gearbox | Gearbox Case | 20 | Estimate |
| | Vibration Absorber | 3 | Rotax, Inc. |
| | Clutch | 20 | Estimate |
| | Reduction Gears | 9 | Estimate |
| | Spiral Bevel Gears | 14 | Arrow Gear Company |
| | Freewheel Assembly | 6 | Estimate |
| | First Shaft | 2 | Estimate |
| | Second Shaft | 3 | Estimate |
| Subtotal: 89 lb. | Nested Shafts | 9 | Estimate |
| | Gearbox Mount | 3 | Estimate |
| Rotors | Hubs, Stars & Turnbuckles | 10 | Estimate |
| Subtotal: 40 lb. | Rotor Blades | 30 | Estimate |
| | TOTAL WEIGHT | 472 | (lb) |
| | EMPTY WEIGHT | 247.5 | (lb) |
| | Maximum Engine Power | 38.5 | (hp) |
| | Rotor Diameter | 13 | (ft) |
| | Rotor Area | 265.46435 | (sq. ft.) |
| | Disk Loading | 1.7780165 | (lb/sq. ft.) |
| | Power Loading | 12.259740 | (lb./hp) |

The engine and powerplant chosen is adequate to provide the requisite power as shown in Table 1 by the disk loading and power loading data. Note that "disk loading" is defined as the total weight of the aircraft divided by the total disk area swept out by the rotor blades. "Power loading" is defined as the total weight of the aircraft divided by the maximum power produced by the engines. Typically a 20-25% penalty for tail rotor losses are built-in to the design of standard helicopters. These losses are avoided in the present invention because of the absence of a tail rotor.

Figure 5:
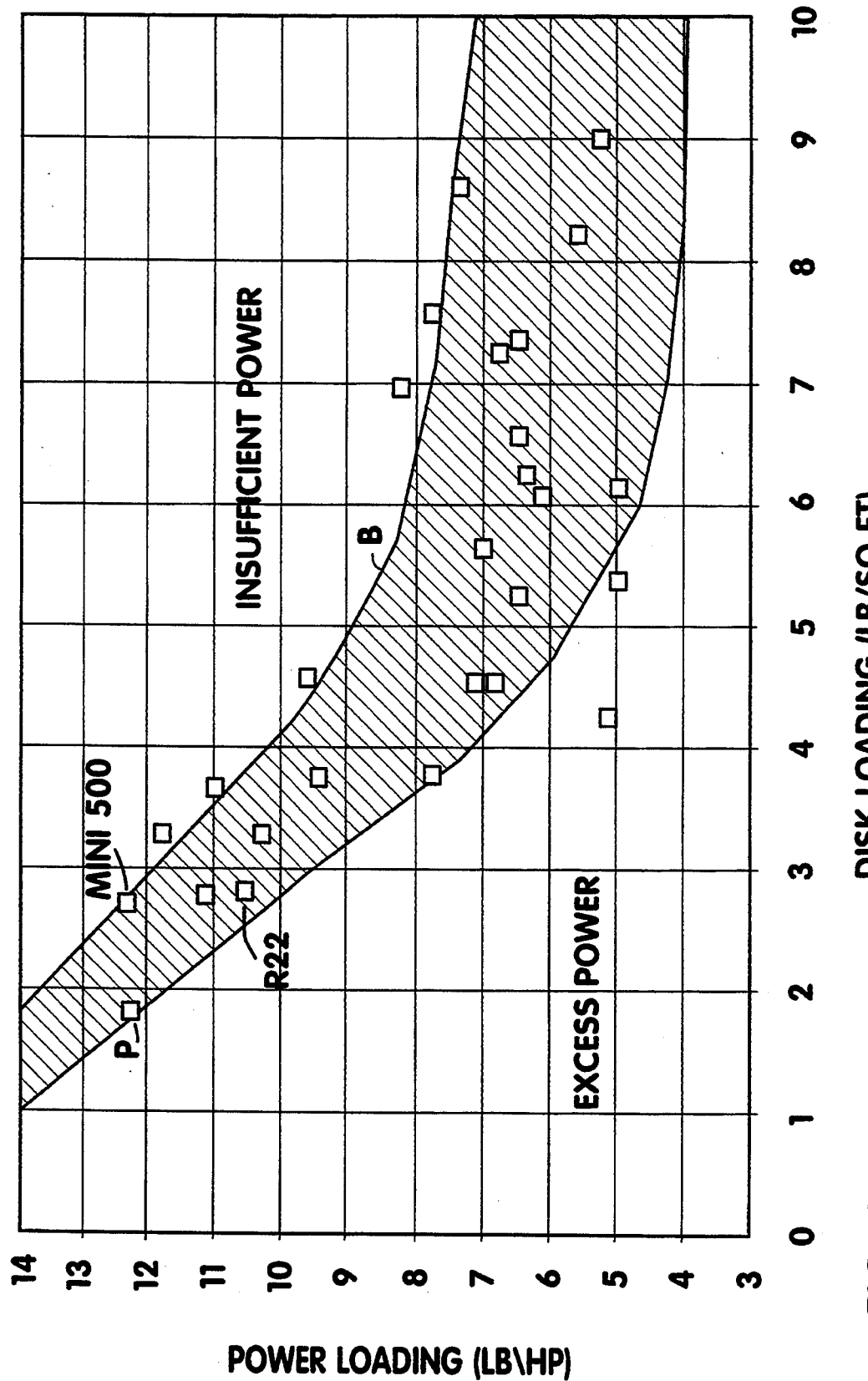

FIG. 5 is a plot of disk loading versus power loading for representative helicopters, the information for which was obtained from *Jane's All the World's Aircraft*, (82nd ed. 1991-92), which is hereby incorporated by reference. A data point P for the helicopter of this invention falls within a band B of acceptable power loading versus disk loading. Furthermore, as shown in Table 1, the empty weight of the helicopter falls below the 254 lb. as required in FAR Part 103 for ultralight aircraft.

Engine throttle control may preferably be integrated with an automatic rotor speed control. In other words, as the pilot 44 shifts his weight around and maneuvers the aircraft 10, he may find it difficult to hold a desired engine speed through the throttle control twist grip 54 or other actuator arrangement, since the rotor collective pitch control often must be continuously manipulated. If this proves too difficult to accomplish manually, then a relatively simple electro-mechanical speed control system as is well known in the art can be included. A preferred automatic rotor speed control of the type described would maintain the rotor speed at a fixed setting until disengaged by the pilot. With such an automatic rotor speed control device, the pilot will simply set a specific rotor speed, turn on the speed control, and operate the helicopter 10 with the collective pitch control system 19 and the control bar 52.

Figure 4A:
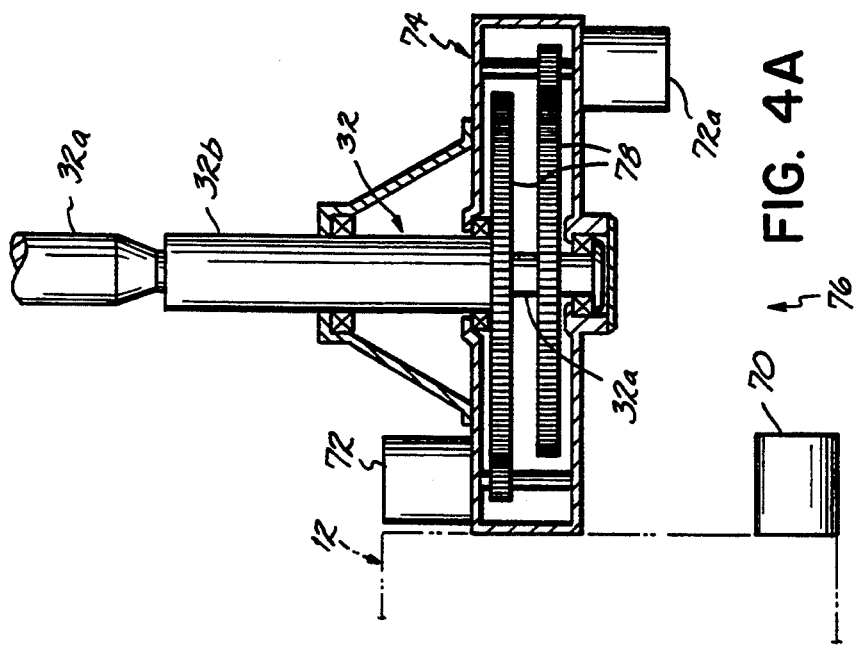
FIG. 4A is a schematic representation of a hydraulic rotor drive assembly.

An alternative to the gearbox arrangement of components in FIG. 3 may be used to drive the helicopter rotor assemblies 14, 14a as shown in FIGS. 4A and 4B. The engine 12 directly drives a hydraulic pump 70, which supplies pressurized hydraulic fluid to a pair of hydraulic motors 72, 72a which in turn drive the rotors 14, 14a through a gearbox 74. The gearbox 74 required for such a drive system 76 is greatly simplified compared to the configuration of FIG. 3 and consists of only one set of spur gears 78 per rotor 14, 14a. The hydraulic circuit drive system 76 is so arranged that a clutching function is provided by valve 80 (with the valve open, fluid bypasses the hydraulic motors 72, 72a and does not drive the rotors 14, 14a). A freewheeling function is provided by check valve 82 (when the rotors 14, 14a overrun the hydraulic pump 70, fluid on the return circuit becomes pressurized, opens the check valve 82 and bypasses the pump 70). In addition, a small heat exchanger 84 is required to dissipate heat. The disadvantage of the hydraulic system 76 with respect to the gearbox 16 of FIG. 3 is that some portion of the engine power is lost as heat, but the advantage is one of reduced cost and complexity compared to the gearbox 16.

It will be appreciated that the number of rotor blades 18 can be varied from the number shown, as from two on each rotor assembly 14 to three or more. The simple teetering rotor hubs shown and described herein may be replaced with articulated rotor hubs if greater than two rotor blades are included on each rotor; this replacement could readily be executed by those skilled in the art of helicopter rotor design.

An alternative embodiment of this invention alters the rotor configuration wherein the rotors 14, 14a are side-by-side, counter-rotating and intermeshing. The rotors in such a configuration are prevented from impacting each other by means of a cant angle between the two rotor axes, and gears that drive the rotors 90° out of phase with each other. This configuration was used for several machines in the 1940's and 1950's, and is well known by those skilled in the art. In the present invention, it may again be employed to advantage to simplify the gearbox.

In order to make the helicopter 10 more weatherproof, in an alternative embodiment the pilot 44 may be totally enclosed in a cockpit shell, which would replace portions of the open airframe 13 shown in FIGS. 1 and 2. The pilot 44 would be suspended in the harness 46 as before and control the helicopter 10 with the same weight shift, throttle control and collective pitch control operation as previously described. It is envisioned that the weight for the cockpit should not be too great so that the total weight for the helicopter exceeds the maximum of 254 lbs. established in FAR 103.

In an alternative embodiment, the arrangement of engine 12 and gearbox 16 may be changed to one more appropriate to the vehicle, that is, the engine would include a vertical output shaft, which would feed into a vertically aligned gearbox. In particular, since the engine is by far the heaviest item on the aircraft (excepting the pilot), it may be difficult to counterbalance the engine weight if it is hung too far forward of the rotor centerline.

It may prove preferable for certain pilots to fly in a supine or seated, position rather than the prone position shown in the drawings. This can be accomplished with a relatively minor change in the airframe geometry and in the configuration of the pilot's harness. It also is feasible to use a suspended seat arrangement which differs from a hang gliding harness but which performs the same function. These and other pilot containing carrier assemblages as alternatives are well within the capability of one of ordinary skill in the art and the scope of this invention.

From the above disclosure of the general principles of the present invention and the preceding detailed description of preferred embodiments, those skilled in the art will readily comprehend the various modifications to which this invention is susceptible. Therefore, I desire to be limited only by the scope of the following claims and equivalents thereof.

What is claimed is:

1. A helicopter comprising:
    a frame;
    an engine mounted on said frame;
    at least one rotor assembly mounted on said frame and coupled to said engine for rotation, said at least one rotor assembly having a plurality of rotors;
    a rotor pitch control mechanism to adjust the pitch of said plurality of rotors;
    a throttle control mechanism to adjust the rotational speed of said at least one rotor assembly; and
    a pilot containing carrier assemblage connected to said frame, said carrier assemblage being moveable relative to said frame by said pilot during flight in order to provide for pitch and roll adjustments of the helicopter.

2. The helicopter of claim 1 comprising a pair of counter-rotating rotor assemblies, the combined rotation of said pair of rotor assemblies resulting in approximately zero net angular momentum delivered to said frame.

3. The helicopter of claim 2 wherein said pair of rotor assemblies have a common axis of rotation.

4. The helicopter of claim 1 wherein said carrier assemblage is a harness in which said pilot is suspended from a hang point positioned proximate the center of lift of the helicopter.

5. The helicopter of claim 1 further comprising:
    a control bar fixed to said frame, said control bar being manipulated by said pilot to shift the center of gravity of said pilot in said carrier assemblage relative to the center of gravity of the helicopter to control the pitch and roll of the helicopter.

6. The helicopter of claim 5 wherein said throttle control mechanism is adjustable via a throttle control actuator on said control bar.

7. The helicopter of claim 5 wherein said at least one rotor assembly includes variable pitch rotors.

8. The helicopter of claim 7 wherein said variable pitch rotors are adjustable via a variable pitch actuator on said control bar.

9. The helicopter of claim 1 further comprising:
    a plurality of safety straps connecting said carrier assemblage to said frame to prevent inadvertent contact by the pilot with said frame.

10. The helicopter of claim 1 wherein said throttle control mechanism includes means for setting and temporarily maintaining a specific rotor assembly speed.

11. The helicopter of claim 1 wherein said engine is coupled to said at least one rotor assembly via a gearbox.

12. The helicopter of claim 1 wherein said engine is coupled to said at least one rotor assembly via a hydraulic drive system, said hydraulic drive system comprising a hydraulic pump and at least one hydraulic motor driving each said rotor assembly.

13. The helicopter of claim 1 further comprising:
a tail assembly connected to said frame, said tail assembly including a tail rudder to provide added stability to the helicopter during forwardly directed flight.

14. The helicopter of claim 1 wherein said engine is mounted to said frame on vibration dampening mounts.

15. The helicopter of claim 1 wherein the total empty weight of the helicopter is not greater than 254 pounds.

16. A helicopter comprising:
a frame;
an engine mounted on said frame;
a pair of counter-rotating coaxial rotor assemblies mounted on said frame and coupled to said engine for rotation, the combined rotation of said pair of rotor assemblies resulting in approximately zero net angular momentum delivered to said frame, said rotor assemblies each having a plurality of variable pitch rotors;
a rotor pitch control mechanism to adjust the collective pitch of said plurality of variable pitch rotors, said variable pitch rotors being adjustable via a variable pitch actuator;
a throttle control mechanism to adjust the rotational speed of said rotor assemblies, said throttle control mechanism being adjustable via a throttle control actuator;
a harness in which a pilot is suspended from a hang point positioned proximate the axis of rotation of said rotor assemblies, said harness being moveable relative to said frame by said pilot during flight;
a control bar fixed to said frame, said control bar being manipulated by said pilot to shift the center of gravity of said pilot in said harness relative to the center of gravity of the helicopter to control the pitch and roll of the helicopter, said throttle control actuator and said variable pitch actuator being located on said control bar; and
a tail assembly connected to said frame, said tail assembly including vertical and horizontal stabilizers to provide added stability to the helicopter during forwardly directed flight.

17. The helicopter of claim 16 further comprising:
a plurality of safety straps connecting said harness to said frame to prevent inadvertent contact by said pilot with said frame.

18. The helicopter of claim 16 wherein said throttle control mechanism includes means for setting and temporarily maintaining a specific rotor assembly speed.

19. The helicopter of claim 16 wherein said engine is coupled to said rotor assemblies via a gearbox.

20. The helicopter of claim 16 wherein said engine is coupled to said rotor assemblies via a hydraulic drive system, said hydraulic drive system comprising a hydraulic pump and at least one hydraulic motor driving each said rotor assembly.

21. The helicopter of claim 16 wherein said engine is mounted to said frame on vibration dampening mounts.

22. The helicopter of claim 16 wherein the total empty weight of the helicopter is not greater than 254 pounds.

* * * * *